(12) United States Patent
Ebato et al.

(10) Patent No.: US 11,121,384 B2
(45) Date of Patent: Sep. 14, 2021

(54) FRAME EQUIPPED MEMBRANE ELECTRODE ASSEMBLY AND FUEL CELL

(71) Applicant: HONDA MOTOR CO., LTD., Tokyo (JP)

(72) Inventors: Yutaka Ebato, Wako (JP); Satoru Terada, Wako (JP); Hiroyuki Tanaka, Torrance, CA (US); Matthew J. Beutel, Webster, NY (US)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 16/526,531

(22) Filed: Jul. 30, 2019

(65) Prior Publication Data
US 2021/0036338 A1    Feb. 4, 2021

(51) Int. Cl.
| H01M 8/0273 | (2016.01) |
| H01M 8/0284 | (2016.01) |
| H01M 8/1004 | (2016.01) |
| H01M 8/10 | (2016.01) |
| H01M 8/242 | (2016.01) |

(52) U.S. Cl.
CPC ....... *H01M 8/0273* (2013.01); *H01M 8/0284* (2013.01); *H01M 8/10* (2013.01); *H01M 8/1004* (2013.01); *H01M 8/242* (2013.01); *Y02E 60/50* (2013.01)

(58) Field of Classification Search
CPC .. H01M 8/0273; H01M 8/1004; H01M 8/242; H01M 8/1018; H01M 2250/20; H01M 2008/1095; H01M 8/10; H01M 8/0284; Y02E 60/50
See application file for complete search history.

(56) References Cited

U.S. PATENT DOCUMENTS

| 8,399,150 B2 | 3/2013 | Miller et al. |
| 9,911,988 B2 | 3/2018 | Beutel et al. |

(Continued)

FOREIGN PATENT DOCUMENTS

| DE | 102016212912 A1 | 1/2017 |
| JP | 2013-515348 A | 5/2013 |

(Continued)

OTHER PUBLICATIONS

U.S. Appl. No. 15/910,752, filed Mar. 2, 2018, 6155.

(Continued)

*Primary Examiner* — Philip A. Stuckey
(74) *Attorney, Agent, or Firm* — Carrier Blackman & Associates, P.C.; William D. Blackman; Joseph P. Carrier

(57) ABSTRACT

A frame equipped membrane electrode assembly includes a membrane electrode assembly and a frame member having a first frame shaped sheet provided on an outer peripheral portion of the membrane electrode assembly. An outer peripheral portion of an electrolyte membrane is provided between a cathode and the first frame shaped sheet, stacked on an outer peripheral portion of the cathode, and joined to an inner peripheral portion of the first frame shaped sheet through an adhesive layer. The elastic modulus of the first frame shaped sheet is larger than the elastic modulus of the electrolyte membrane. The elastic modulus of the adhesive layer is smaller than the elastic modulus of the first frame shaped sheet and the elastic modulus of the electrolyte membrane.

5 Claims, 3 Drawing Sheets

(56) References Cited

U.S. PATENT DOCUMENTS

| | | |
|---|---|---|
| 10,381,661 B2 | 8/2019 | Ohmori et al. |
| 2005/0142397 A1 | 6/2005 | Wakahoi et al. |
| 2009/0208805 A1 | 8/2009 | Wakabayashi et al. |
| 2011/0136038 A1 | 6/2011 | Ishida et al. |
| 2011/0151350 A1 | 6/2011 | Iverson et al. |
| 2014/0017590 A1 | 1/2014 | Sugishita et al. |
| 2015/0031817 A1* | 1/2015 | Takayanagi ............ C09J 163/00 524/451 |
| 2015/0099208 A1 | 4/2015 | Sugiura et al. |
| 2016/0260993 A1* | 9/2016 | Ikeda .................. H01M 8/1004 |
| 2016/0285119 A1 | 9/2016 | Hayashi |
| 2020/0381759 A1* | 12/2020 | Kajiwara ............ H01M 8/0204 |

FOREIGN PATENT DOCUMENTS

| | | |
|---|---|---|
| JP | 2017-045637 A | 3/2017 |
| JP | 2017-079170 A | 4/2017 |
| WO | 2012/137609 A1 | 10/2012 |

OTHER PUBLICATIONS

Office Action and Search Report, both dated Nov. 22, 2019, issued over the corresponding German Patent Application No. 10 2019 202 686.9 of co-pending U.S. Appl. No. 15/910,810, with the English translations thereof.

Office Action issued in co-pending U.S. Appl. No. 15/910,810 dated Aug. 21, 2019.

Office Action issued in co-pending U.S. Appl. No. 15/910,752 dated Jul. 10, 2020.

Office Action dated Dec. 22, 2020 issued over a corresponding Japanese Patent Application No. 2019-037510, to co-pending U.S. Appl. No. 15/910,752, with the English translation thereof.

Office Action dated Jan. 7, 2021 issued in co-pending U.S. Appl. No. 15/910,752.

* cited by examiner

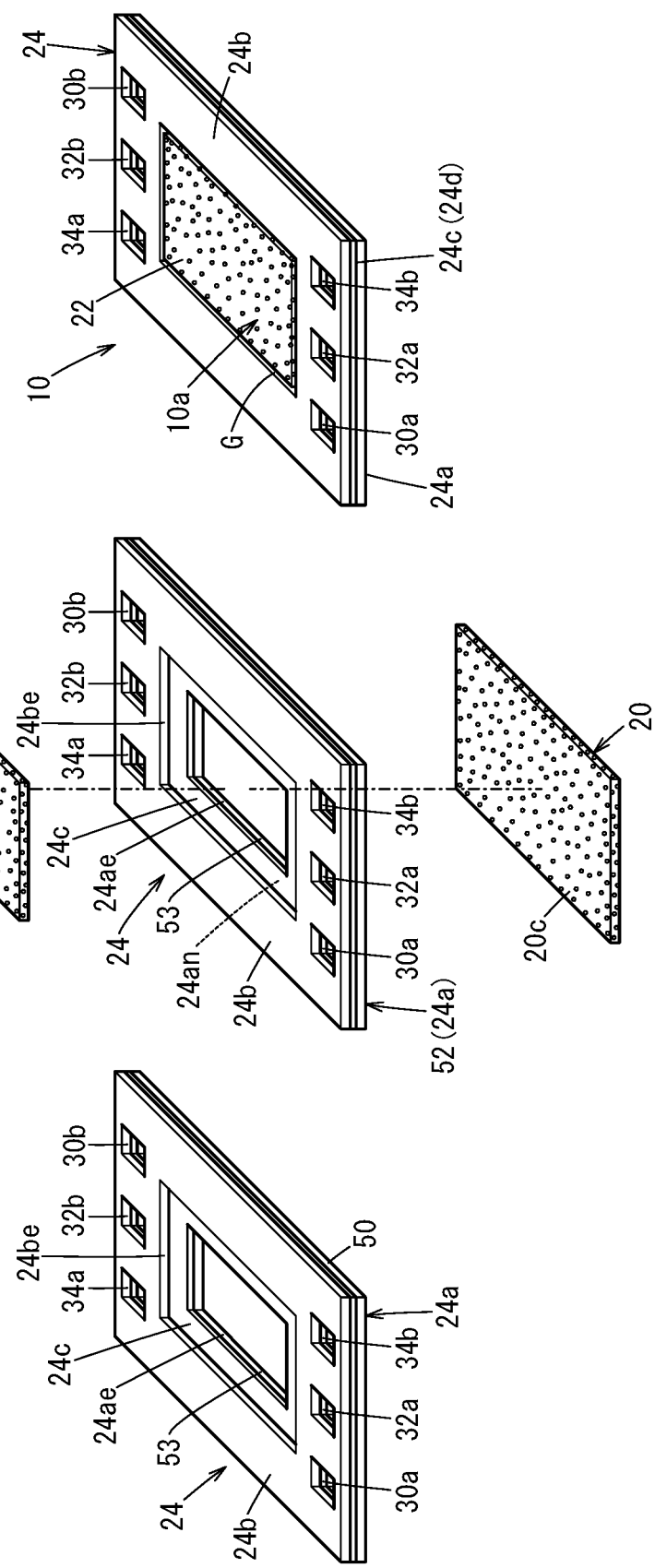

FRAME EQUIPPED MEMBRANE ELECTRODE ASSEMBLY AND FUEL CELL

BACKGROUND OF THE INVENTION

Field of the Invention

The present invention relates to a frame equipped membrane electrode assembly and a fuel cell.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane.

The membrane electrode assembly is sandwiched between separators (bipolar plates) to form a power generation cell unit cell). In use, a predetermined number of power generation cells are stacked together to form an in-vehicle fuel cell stack, for example.

In recent years, in an attempt to reduce the quantity of the relatively expensive solid polymer electrolyte membrane, and protect the thin solid polymer electrolyte membrane having the low strength, a frame equipped MEA including a resin frame member in its outer periphery has been adopted. In the frame equipped MEA disclosed in U.S. Pat. No. 8,399,150, an inner peripheral portion of the resin frame member is joined to an outer peripheral portion of the electrolyte membrane.

SUMMARY OF THE INVENTION

In the technique of U.S. Pat. No. 8,399,150, at the time of joining the membrane electrode assembly and resin frame member together by thermal compression bonding, the inner peripheral end of the resin frame member may be brought into contact with the electrolyte membrane directly, and the inner peripheral end of the resin frame member may bite into the electrolyte membrane to cause deformation of the electrolyte membrane.

The present invention has been made taking such a problem into account, and an object of the present invention is to provide a frame equipped membrane electrode assembly and a fuel cell in which it is possible to prevent deformation of an electrolyte membrane due to biting of an inner peripheral end of a resin frame member into the electrolyte membrane, and improve durability of the electrolyte membrane.

In order to achieve the above object, according to a first aspect of the present invention, a frame equipped membrane electrode assembly is provided. The frame equipped membrane electrode assembly includes a membrane electrode assembly and a frame member, the membrane electrode assembly including an electrolyte membrane, a first electrode provided on one surface of the electrolyte membrane, and a second electrode provided on another surface of the electrolyte membrane, the frame member including a resin sheet provided on an outer peripheral portion of the membrane electrode assembly over its entire periphery, wherein an outer peripheral portion of the electrolyte membrane is provided between the second electrode and the resin sheet, stacked on an outer peripheral portion of the second electrode, and joined to an inner peripheral portion of the resin sheet through an adhesive layer, an elastic modulus of the resin sheet is larger than an elastic modulus of the electrolyte membrane, and an elastic modulus of the adhesive layer is smaller than the elastic modulus of the resin sheet and the elastic modulus of the electrolyte membrane.

According to another aspect of the present invention, a fuel cell is provided. The fuel cell includes a frame equipped membrane electrode assembly and separators provided on both sides of the frame equipped membrane electrode assembly, respectively, the frame equipped membrane electrode assembly including a membrane electrode assembly and a frame member, the membrane electrode assembly including an electrolyte membrane, a first electrode provided on one surface of the electrolyte membrane, and a second electrode provided on another surface of the electrolyte membrane, the frame member including a resin sheet provided on an outer peripheral portion of the membrane electrode assembly over its entire periphery, wherein an outer peripheral portion of the electrolyte membrane is provided between the second electrode and the resin sheet, stacked on an outer peripheral portion of the second electrode, and joined to an inner peripheral portion of the resin sheet through an adhesive layer, an elastic modulus of the resin sheet is larger than an elastic modulus of the electrolyte membrane, and an elastic modulus of the adhesive layer is smaller than the elastic modulus of the resin sheet and the elastic modulus of the electrolyte membrane.

In the membrane electrode assembly and the fuel cell according to the present invention, the magnitude relationship of the elastic modulus of the electrolyte membrane, the elastic modulus of the resin sheet, and the elastic modulus of the adhesive layer are determined suitably, for allowing the adhesive layer to serve as a protection layer (cushion member). Thus, the electrolyte membrane and the resin sheet do not contact each other directly. Accordingly, it is possible to prevent deformation of the electrolyte membrane due to biting of the inner peripheral end of the resin sheet into the electrolyte membrane, and thus, improve the durability of the membrane electrode assembly.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3A is a perspective view showing a frame member;

FIG. 3B is a view showing a MEA joining step; and

FIG. 3C is a perspective view showing an obtained frame equipped membrane electrode assembly.

DESCRIPTION OF THE PREFERRED EMBODIMENTS

Figure 1:
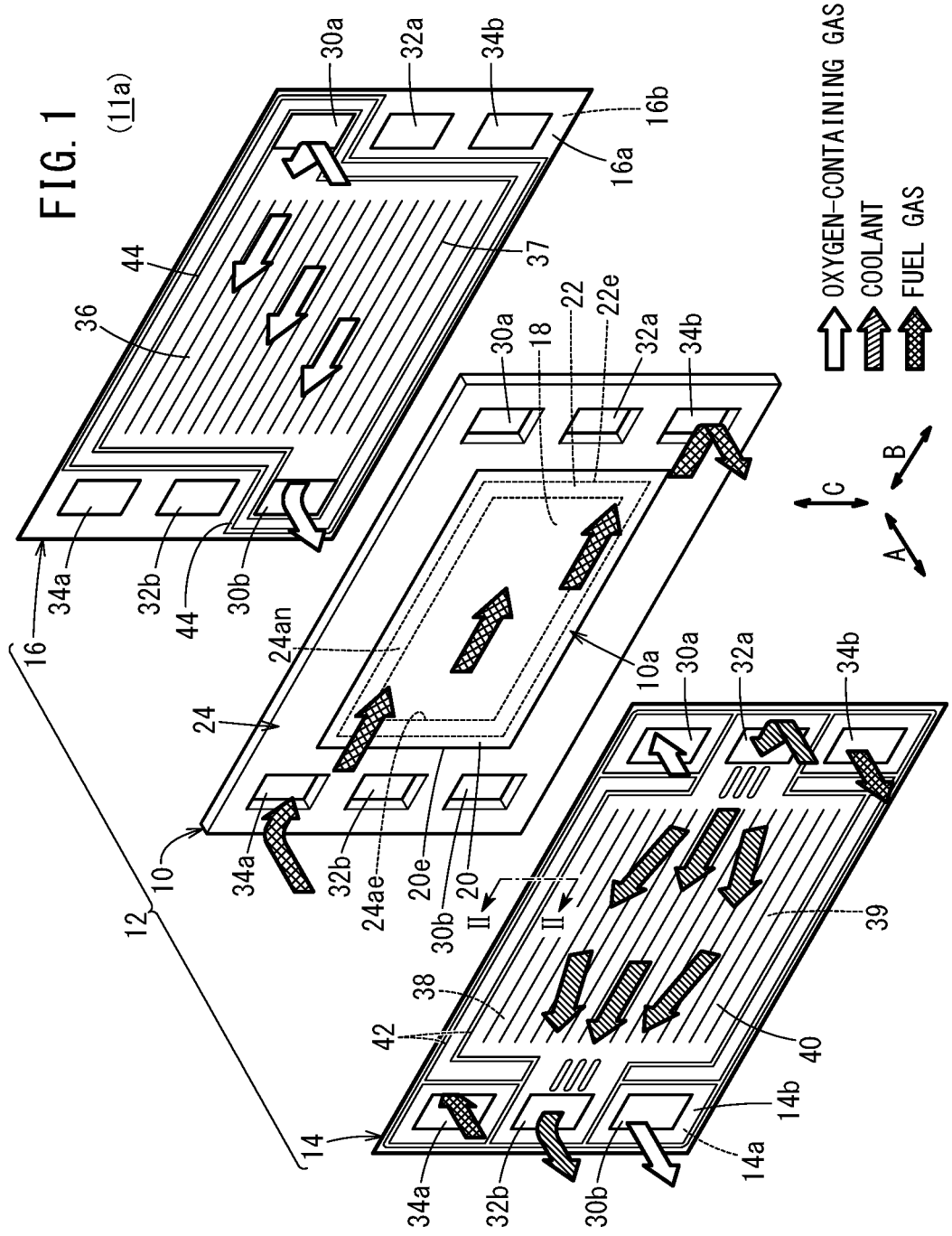
FIG. 1 is an exploded perspective view showing main components of a power generation cell (fuel cell) according to an embodiment of the present invention.
Figure 2:
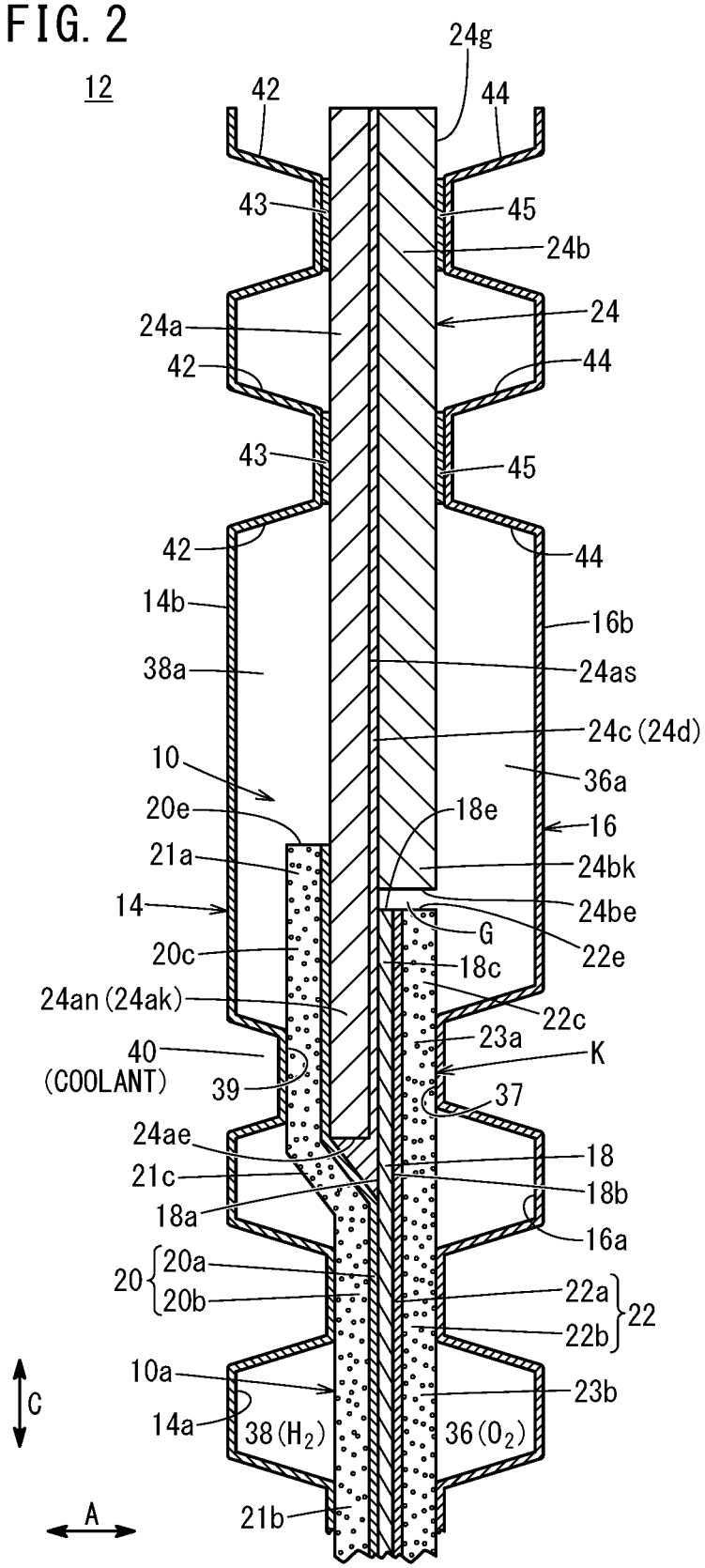
FIG. 2 is a cross sectional view taken along a line II-II in FIG. 1.

As shown in FIGS. 1 and 2, a power generation cell (fuel cell) 12 includes a frame equipped membrane electrode assembly 10 (hereinafter referred to as the "frame equipped MEA 10"), and a first separator 14 and a second separator 16 provided on both sides of the frame equipped MEA 10. For example, the power generation cell 12 is a laterally elongated (longitudinally elongated) rectangular solid polymer electrolyte fuel cell. A plurality of power generation cells 12 are stacked together in a horizontal direction indicated by an arrow A or in a gravity direction indicated by an arrow C to form a fuel cell stack 11a. For example, the fuel cell stack 11a is mounted in a fuel cell electric automobile (not shown) as an in-vehicle fuel cell stack.

In the power generation cell 12, the frame equipped MEA 10 is sandwiched between the first separator 14 and the second separator 16. Each of the first separator 14 and the second separator 16 has a laterally elongated (or longitudinally elongated) rectangular shape. For example, the first separator 14 and the second separator 16 are steel plates, stainless steel plates, aluminum plates, plated steel sheets, or metal plates having anti-corrosive surfaces by surface treatment. Alternatively, carbon member or the like may be used as the first separator 14 and the second separator 16.

The rectangular frame equipped MEA 10 includes a membrane electrode assembly 10a (hereinafter referred to as the "MEA 10a"). The MEA 10a includes an electrolyte membrane 18, an anode (first electrode) 20 provided on one surface of the electrolyte membrane 18, and a cathode (second electrode) 22 provided on the other surface of the electrolyte membrane 18.

For example, the electrolyte membrane 18 includes a solid polymer electrolyte membrane (cation ion exchange membrane). For example, the solid polymer electrolyte membrane is a thin membrane of perfluorosulfonic acid containing water. The electrolyte membrane 18 is interposed between the anode 20 and the cathode 22. A fluorine based electrolyte may be used as the electrolyte membrane 18. Alternatively, an HC (hydrocarbon) based electrolyte may be used as the electrolyte membrane 18.

The surface size (outer size) of the anode 20 is larger than the surface sizes of the electrolyte membrane 18 and the cathode 22. Therefore, the outer peripheral end of the anode 20 is positioned outside an outer peripheral end 18e of the electrolyte membrane 18 and an outer peripheral end 22e of the cathode 22 over the entire periphery. It should be noted that, instead of adopting the above structure, the surface size of the anode 20 may be smaller than the surface sizes of the electrolyte membrane 18 and the cathode 22.

As shown in FIG. 2, the anode 20 includes a first electrode catalyst layer 20a joined to one surface 18a of the electrolyte membrane 18, and a first gas diffusion layer 20b stacked on the first electrode catalyst layer 20a. The surface sizes of the first electrode catalyst layer 20a and the first gas diffusion layer 20b are the same, and larger than the surface sizes of the electrolyte membrane 18 and the cathode 22.

The surface size of the cathode 22 is smaller than the surface size of the anode 20. The outer peripheral end 22e of the cathode 22 and the outer peripheral end 18e of the electrolyte membrane 18 are positioned inside an outer peripheral end 20e of the anode 20 over the entire periphery.

It should be noted that the surface size of the cathode 22 may be larger than the surface size of the anode 20, and the outer peripheral end 22e of the cathode 22 may be positioned outside the outer peripheral end 20e of the anode 20 over the entire periphery.

The cathode 22 includes a second electrode catalyst layer 22a joined to a surface 18b of the electrolyte membrane 18, and a second gas diffusion layer 22b stacked on the second electrode catalyst layer 22a. The surface sizes of the second electrode catalyst layer 22a, the second gas diffusion layer 22b, and the electrolyte membrane 18 are the same. Therefore, as viewed in the thickness direction (indicated by the arrow A) of the MEA 10a, the outer peripheral end 22e of the cathode 22 and the outer peripheral end 18e of the electrolyte membrane 18 are provided at the same position over the entire periphery.

For example, the first electrode catalyst layer 20a is formed by porous carbon particles deposited uniformly on the surface of the first gas diffusion layer 20b together with an ion conductive polymer binder and platinum alloy supported on the surfaces of the porous carbon particles. For example, the second electrode catalyst layer 22a is formed by porous carbon particles deposited uniformly on the surface of the second gas diffusion layer 22b together with an ion conductive polymer binder and platinum alloy supported on the surfaces of the porous carbon particles.

Each of the first gas diffusion layer 20b and the second gas diffusion layer 22b comprises a carbon paper or a carbon cloth, etc. The surface size of the second gas diffusion layer 22b is smaller than the surface size of the first gas diffusion layer 20b. The first electrode catalyst layer 20a and the second electrode catalyst layer 22a are formed on both surfaces of each electrolyte membrane 18.

The frame equipped MEA 10 further includes a rectangular frame member 24 which is provided along the outer periphery of the electrolyte membrane 18 over the entire periphery, and joined to the anode 20 and the cathode 22. The frame member 24 includes two frame shaped sheets (resin sheet). Specifically, the frame member 24 includes a first frame shaped sheet 24a having an inner peripheral portion 24an joined to an outer peripheral portion of the MEA 10a, and a second frame shaped sheet 24b joined to the first frame shaped sheet 24a.

The first frame shaped sheet 24a and the second frame shaped sheet 24b are directly joined together by an adhesive layer 24c of an adhesive 24d over the entire periphery (over the entire periphery of the surface of the second frame shaped sheet 24b adjacent to the first frame shaped sheet 24a). The second frame shaped sheet 24b is joined to the outer peripheral portion of the first frame shaped sheet 24a. The thickness of an outer peripheral portion 24g of the frame member 24 is larger than the thickness of the inner peripheral portion of the frame member 24 (inner peripheral portion 24an of the first frame shaped sheet 24a).

The first frame shaped sheet 24a and the second frame shaped sheet 24b are made of resin material. Examples of materials of the first frame shaped sheet 24a and the second frame shaped sheet 24b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The inner peripheral portion 24an of the first frame shaped sheet 24a is positioned between an outer peripheral portion 20c of the anode 20 and an outer peripheral portion 22c of the cathode 22. Specifically, the inner peripheral portion 24an of the first frame shaped sheet 24a is held between an outer peripheral portion 18c of the electrolyte membrane 18 and the outer peripheral portion 20c of the anode 20. The inner peripheral portion 24an of the first frame shaped sheet 24a and the outer peripheral portion 18c of the electrolyte membrane 18 are joined together through the adhesive layer 24c. In the structure, the outer peripheral portion 18c of the electrolyte membrane 18 is positioned between the cathode 22 and the first frame shaped sheet 24a, stacked on the outer peripheral portion 22c of the cathode 22, and joined to the inner peripheral portion of the first frame shaped sheet 24a through the adhesive layer 24c. In the embodiment of the present invention, the adhesive layer 24c is provided continuously from the inner peripheral portion to the outer peripheral portion of the first frame shaped sheet 24a. The adhesive layer 24c for joining the first frame shaped sheet 24a and the second frame shaped sheet 24b and the adhesive layer 24c for joining the inner peripheral portion of the first frame shaped sheet 24a and the outer peripheral portion 18c of the electrolyte membrane 18 may be provided independently (separately) from each other.

The inner peripheral portion 24an of the first frame shaped sheet 24a includes an overlap part 24ak overlapped with the outer peripheral portion 20c of the anode 20 over the entire periphery as viewed in the thickness direction of the MEA 10a. The inner peripheral portion 24an of the first frame shaped sheet 24a may be interposed between the electrolyte membrane 18 and the cathode 22 in the state where the adhesive layer 24c is joined to the surface 18b of the electrolyte membrane 18.

A step is provided in the anode 20 at a position corresponding to an inner peripheral end 24ae of the first frame shaped sheet 24a. Specifically, the anode 20 has an inclined area 21c inclined from the electrolyte membrane 18, between an area 21a overlapped with the inner peripheral portion 24an of the first frame shaped sheet 24a and an area 21b overlapped with the electrolyte membrane 18.

On the other hand, the cathode 22 has a flat shape from an area 23a overlapped with the inner peripheral portion 24an of the first frame shaped sheet 24a to an area 23b overlapped with the electrolyte membrane 18. Instead of adopting the above structure, the cathode 22 may have an inclined area inclined from the electrolyte membrane 18 (area inclined in a direction opposite to the inclined area 21c), between the area 23a overlapped with the inner peripheral portion 24an of the first frame shaped sheet 24a and the area 23b overlapped with the electrolyte membrane 18. The anode 20 may have the inclined area 21c and the cathode 22 may have the inclined area.

It should be noted that, instead of adopting the above structure, the anode 20 may have a flat shape from the area 21a overlapped with the inner peripheral portion 24an of the first frame shaped sheet 24a to the area 21b overlapped with the electrolyte membrane 18, and the cathode 22 may have an inclined area inclined from the electrolyte membrane 18, between the area 23a overlapped with the inner peripheral portion 24an of the first frame shaped sheet 24a and the area 23b overlapped with the electrolyte membrane 18.

The second frame shaped sheet 24b is joined to the outer peripheral portion of the first frame shaped sheet 24a. The thickness of the first frame shaped sheet 24a and thickness of the second frame shaped sheet 24b may be the same or may be different from each other.

An inner peripheral end 24be of the second frame shaped sheet 24b is positioned outside the inner peripheral end 24ae of the first frame shaped sheet 24a (in a direction away from the MEA 10a) over the entire periphery. A gap G is formed between the inner peripheral end 24be of the second frame shaped sheet 24b and the outer peripheral end 22e of the cathode 22 over the entire periphery.

The inner peripheral end 24be of the second frame shaped sheet 24b is positioned inside the outer peripheral end 20e of the anode 20 over the entire periphery. As viewed in the thickness direction (indicated by an arrow A) of the MEA 10a, the inner peripheral portion of the second frame shaped sheet 24b includes an overlap part 24bk overlapped with the outer peripheral portion 20c of the anode 20 over the entire periphery. The inner peripheral end 24be of the second frame shaped sheet 24b is positioned outside the outer peripheral end 18e of the electrolyte membrane 18.

The adhesive layer 24c is provided over an entire surface 24as of the first frame shaped sheet 24a adjacent to the second frame shaped sheet 24b (adjacent to the cathode 22). The adhesive layer 24c joins the inner peripheral portion 24an of the first frame shaped sheet 24a and the outer peripheral portion 18c of the electrolyte membrane 18. At the position of the above gap G, the first frame shaped sheet 24a is exposed to the gap G through the adhesive layer 24c. As the adhesive 24d of the adhesive layer 24c, for example, a liquid adhesive or a hot melt sheet is provided. The adhesive 24d is not limited to a liquid or solid adhesive, and not limited to a thermoplastic or thermosetting adhesive, etc. Examples of the adhesive 24d include an acrylic based adhesive. Alternatively, the adhesive 24d may be a rubber-based, urethane based, ester based, or ethylene vinyl based adhesive.

An overlap part K where the anode 20, the first frame shaped sheet 24a, and the cathode 22 are overlapped with each other is held between a ridge 39 of the first separator 14 protruding toward the anode 20 and a ridge 37 of the second separator 16 protruding toward the cathode 22.

The elastic modulus E1 of the first frame shaped sheet 24a, the elastic modulus E2 of the adhesive layer 24c, and the elastic modulus E3 of the electrolyte membrane 18 are determined to satisfy the following magnitude relationship. The "elastic modulus" herein all means "tensional elastic modulus". The elastic modulus E1 of the first frame shaped sheet 24a is larger than the elastic modulus E3 of the electrolyte membrane 18. The elastic modulus E2 of the adhesive layer 24c is smaller than the elastic modulus E1 of the first frame shaped sheet 24a and the elastic modulus E3 of the electrolyte membrane 18. That is, the elastic modulus E1 of the first frame shaped sheet 24a, the elastic modulus E2 of the adhesive layer 24c, and the elastic modulus E3 of the electrolyte membrane 18 are determined to satisfy the relationship of: $E>E3>E2$.

The elastic modulus E2 of the adhesive layer 24c is determined to be, e.g., not more than 50% of the elastic modulus E3 of the electrolyte membrane 18. The elastic modulus E2 of the adhesive layer 24c is determined to be, e.g., not more than 30% of the elastic modulus E3 of the electrolyte membrane 18. The elastic modulus E2 of the adhesive layer 24c is determined to be, e.g., not more than 20% of the elastic modulus E3 of the electrolyte membrane 18. The elastic modulus E2 of the adhesive layer 24c is determined to be, e.g., not more than 10% of the elastic modulus E3 of the electrolyte membrane 18.

The elastic modulus E1 of the first frame shaped sheet 24a at 120° C. is, e.g., not less than 1000 Mpa. The elastic modulus E2 of the adhesive layer 24c at 120° C. is in the range between 0.5 Mpa and 10 Mpa. In the case where the elastic modulus E2 of the adhesive layer 24c is too low (e.g., not more than 0.1 Mpa), cushioning effects cannot be realized. The elastic modulus E3 of the electrolyte membrane 18 at 120° C. is in the range between 10 Mpa and 100 Mpa.

The thickness of the electrolyte membrane 18 and the thickness of the adhesive layer 24c are smaller than the thickness of the first frame shaped sheet 24a. The thickness of the electrolyte membrane 18 and the thickness of the adhesive layer 24c are determined to become relatively close to each other, or substantially the same (the proportion of the thickness of the adhesive layer 24c relative to the thickness of the electrolyte membrane 18 is, e.g., in the range between about 80% and 120%). The thickness of the first frame shaped sheet 24a is, e.g., in the range between 25 μm and 150 μm. The thickness of the adhesive layer 24c is, e.g., in the range between 6 μm and 20 μm. The thickness of the electrolyte membrane 18 is, e.g., in the range between 6 μm and 20 μm.

As shown in FIG. 1, at one end of the power generation cell 12 in the direction indicated by the arrow B (in the horizontal direction), an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the direction indicated by the arrow A. An oxygen-containing gas is supplied through the oxygen-containing gas supply passage 30a, and a coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The first separator 14 has a fuel gas flow field 38 on its surface 14a facing the frame equipped MEA 10. The fuel gas flow field 38 is connected to the fuel gas supply passage 34a and the fuel gas discharge passage 34b. Specifically, the fuel gas flow field 38 is formed between the first separator 14 and the frame equipped MEA 10. The fuel gas flow field 38 includes a plurality of straight flow grooves (or wavy flow grooves) extending in the direction indicated by the arrow B.

The second separator 16 has an oxygen-containing gas flow field 36 on its surface 16a facing the frame equipped MEA 10. The oxygen-containing gas flow field 36 is connected to the oxygen-containing gas supply passage 30a and the oxygen-containing gas discharge passage 30b. Specifically, the oxygen-containing gas flow field 36 is formed between the second separator 16 and the frame equipped MEA 10. The oxygen-containing gas flow field 36 includes a plurality of straight flow grooves (or wavy flow grooves) extending in the direction indicated by the arrow B.

A coolant flow field 40 is formed between a surface 14b of the first separator 14 and a surface 16b of the second separator 16 that are adjacent to each other. The coolant flow field 40 is connected to the coolant supply passage 32a and the coolant discharge passage 32b, and extends in the direction indicated by the arrow B.

As shown in FIG. 2, a plurality of ridges 39 forming the fuel gas flow field 38 are provided on the surface 14a of the first separator 14 (facing the frame equipped MEA 10). The ridges 39 are expanded toward the anode 20, and contact the anode 20. A plurality of ridges 37 forming the oxygen-containing gas flow field 36 are provided on the surface 16a of the second separator 16 (facing the frame equipped MEA 10). The ridges 37 are expanded toward the cathode 22, and contact the cathode 22. The MEA 10a is held between the ridges 37, 39.

One or a plurality of bead seals 42 are formed on the surface 14a of the first separator 14, around the outer peripheral portion of the first separator 14, for preventing leakage of the fuel gas to the outside. The bead seals 42 are formed by press forming, and are expanded toward the frame member 24. The inner bead seal 42 is provided around the fuel gas flow field 38, the fuel gas supply passage 34a, and the fuel gas discharge passage 34b while allowing the fuel gas flow field 38 to be connected to the fuel gas supply passage 34a and the fuel gas discharge passage 34b.

Resin material 43 (or rubber material) is fixed to protruding front end surfaces of the bead seals 42 by printing, coating, etc. The bead seals 42 contact the first frame shaped sheet 24a (area overlapped with the second frame shaped sheet 24b) through the resin material 43 in an air tight and liquid tight manner. The resin material 43 may be fixed to the first frame shaped sheet 24a.

Instead of the bead seals 42, solid seals made of elastic material protruding toward the frame member 24 may be provided on the first separator 14.

One or a plurality of bead seals 44 are formed on the surface 16a of the second separator 16, around the outer peripheral portion of the second separator 16, for preventing leakage of the oxygen-containing gas to the outside. The bead seals 44 are formed by press forming, and are expanded toward the frame member 24. The inner bead seal 44 is provided around the oxygen-containing gas flow field 36, an oxygen-containing gas supply passage 36a, and an oxygen-containing gas discharge passage 36b while allowing the oxygen-containing gas flow field 36 to be connected to the oxygen-containing gas supply passage 30a and the oxygen-containing gas discharge passage 30b.

Resin material 45 (or rubber material) is fixed to protruding front end surfaces of the bead seals 44 by printing, coating, etc. The bead seals 44 contact the second frame shaped sheet 24b (area overlapped with the first frame shaped sheet 24a) through the resin material 45 in an air tight and liquid tight manner. The resin material 45 may be fixed to the second frame shaped sheet 24b.

Instead of the bead seals 44, solid seals made of elastic material protruding toward the frame member 24 may be provided on the second separator 16.

Examples of the resin materials 43, 45 include polyester fiber, silicone, EPDM, FKM, etc. The resin materials 43, 45 are not essential. The resin materials 43, 45 may be dispensed with (in this case, the bead seal 42 contacts the first frame shaped sheet 24a directly, and the bead seal 44 contacts the second frame shaped sheet 24b directly).

The bead seal 42 and the bead seal 44 face each other through the frame member 24. The outer peripheral portion of the frame member 24 (area where the first frame shaped sheet 24a and the second frame shaped sheet 24b are overlapped with each other) is held between the bead seal 42 of the first separator 14 and the bead seal 44 of the second separator 16. In the case where the above solid seals are provided on the first separator 14 and the second separator 16, the outer peripheral portion of the frame member 24 (the area where the first frame shaped sheet 24a and the second frame shaped sheet 24b are overlapped with each other) is held between the solid seal of the first separator 14 and the solid seal of the second separator 16.

Operation of the fuel cell stack 11a including the power generation cell 12 having the above structure will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a into the oxygen-containing gas flow field 36 of the second separator 16. The oxygen-containing gas flows in the direction indicated by the arrow B, and the oxygen-containing gas is supplied to the cathode 22 of the MEA 10a. In the meanwhile, the fuel gas flows from the fuel gas supply passage 34a into the fuel gas flow field 38 of the first separator 14. The fuel gas flows along the fuel gas flow field 38 in the direction indicated by the arrow B, and the fuel gas is supplied to the anode 20 of the MEA 10a.

Thus, in the MEA 10a, the oxygen-containing gas supplied to the cathode 22 and the fuel gas supplied to the anode 20 are partially consumed in the electrochemical reactions in the second electrode catalyst layer 22a and the first electrode catalyst layer 20a to generate electricity.

Then, in FIG. 1, the oxygen-containing gas supplied to the cathode 22 is partially consumed at the cathode 22, and discharged along the oxygen-containing gas discharge passage 30b in the direction indicated by the arrow A. Likewise, the fuel gas supplied to the anode 20 is partially consumed at the anode 20, and the fuel gas is discharged along the fuel gas discharge passage 34b in the direction indicated by the arrow A.

Further, the coolant supplied to the coolant supply passage 32a flows into the coolant flow field 40 between the first separator 14 and the second separator 16, and then, flows in the direction indicated by the arrow B. After the coolant cools the MEA 10a, the coolant is discharged from the coolant discharge passage 32b.

Next, an example of a method of producing the frame equipped MEA 10 will be described.

As shown in FIG. 3A, the above frame member 24 is provided (produced) by joining the first frame shaped sheet 24a and the second frame shaped sheet 24b together by the adhesive layer 24c. An opening 53 is formed at the center of the first frame shaped sheet 24a, inside the inner peripheral end 24be of the second frame shaped sheet 24b. The fuel gas supply passage 34a, the fuel gas discharge passage 34b, the oxygen-containing gas supply passage 30a, the oxygen-containing gas discharge passage 30b, the coolant supply passage 32a, and the coolant discharge passage 32b are formed in the frame member 24.

Next, an MEA joining step is performed as shown in FIG. 3B. In the MEA joining step, the gap G (see FIG. 2) is formed between the inner peripheral end 24be of the second frame shaped sheet 24b and the outer peripheral end 22e of the cathode 22 (which has been joined to the electrolyte membrane 18). In this state, the inner peripheral portion 24an of the first frame shaped sheet 24a is provided between the outer peripheral portion 20c of the anode 20 and the outer peripheral portion 22c of the cathode 22, for joining the first frame shaped sheet 24a to the anode 20 and the cathode 22. In this case, the heat and load are applied to the anode 20, the first frame shaped sheet 24a, the electrolyte membrane 18, and the cathode 22 stacked together in the thickness direction (hot pressing is performed) to join these components together (by thermal compression bonding). As a result, as shown in FIG. 3C, the frame member 24 is joined to the outer peripheral portion of the MEA 10a, and the frame equipped MEA 10 is obtained.

In this case, as shown in FIG. 2, in the frame equipped MEA 10 and the power generation cell 12 according to the embodiment of the present invention, the elastic modulus E2 of the adhesive layer 24c is smaller than the elastic modulus E1 of the first frame shaped sheet 24a and the elastic modulus E3 of the electrolyte membrane 18. As described above, the magnitude relationship of the elastic modulus of the electrolyte membrane 18, the elastic modulus of the first frame shaped sheet 24a, and the elastic modulus of the adhesive layer 24c is determined suitably, for allowing the adhesive layer 24c to serve as a protection layer (cushion member). Thus, the electrolyte membrane 18 and the first frame shaped sheet 24a do not contact each other directly. That is, the adhesive layer 24c having the elastic modulus smaller than those of the first frame shaped sheet 24a and the electrolyte membrane 18 is provided between the first frame shaped sheet 24a and the electrolyte membrane 18. Therefore, the edge of the inner peripheral end 24ae of the first frame shaped sheet 24a does not contact the electrolyte membrane 18 directly. Accordingly, it is possible to prevent deformation of the electrolyte membrane 18 due to biting of the inner peripheral end 24ae of the first frame shaped sheet 24a into the electrolyte membrane 18, and thus, improve the durability of the MEA 10a.

The thickness of the electrolyte membrane 18 and the thickness of the adhesive layer 24c are smaller than the thickness of the first frame shaped sheet 24a. In the structure, it is possible to effectively prevent biting of the inner peripheral end 24ae of the first frame shaped sheet 24a into the electrolyte membrane 18 to a greater extent.

The present invention is not limited to the above described embodiment. Various modifications can be made without departing from the gist of the present invention.

The above embodiment is summarized as follows:

The above embodiment discloses the frame equipped membrane electrode assembly (10) including the membrane electrode assembly (10a) and the frame member (24), the membrane electrode assembly including the electrolyte membrane (18), the first electrode (20) provided on one surface of the electrolyte membrane, and the second electrode (22) provided on the other surface of the electrolyte membrane, and the frame member (24) including the resin sheet (24a) provided on the outer peripheral portion of the membrane electrode assembly over its entire periphery, wherein the outer peripheral portion of the electrolyte membrane is provided between the second electrode and the resin sheet, stacked on an outer peripheral portion of the second electrode, and joined to the inner peripheral portion of the resin sheet through the adhesive layer (24c), the elastic modulus of the resin sheet is larger than the elastic modulus of the electrolyte membrane, and the elastic modulus of the adhesive layer is smaller than the elastic modulus of the resin sheet and the elastic modulus of the electrolyte membrane.

The frame member may include another resin sheet (24b) joined through the adhesive layer to a portion of the resin sheet protruding outside of the second electrode.

The step may be provided in the first electrode at the position corresponding to the inner peripheral end of the resin sheet.

The inner peripheral portion of the other resin sheet may have the overlap part (24bk) overlapped with the outer peripheral portion of the first electrode, as viewed in a thickness direction of the membrane electrode assembly.

The thickness of the electrolyte membrane and the thickness of the adhesive layer may be smaller than the thickness of the resin sheet.

Further, the above embodiment discloses the fuel cell (12), including the frame equipped membrane electrode assembly (10) and separators (14, 16) provided on both sides of the frame equipped membrane electrode assembly, respectively, the frame equipped membrane electrode assembly including the membrane electrode assembly (10a) and the frame member (24), the membrane electrode assembly including an electrolyte membrane (18), the first electrode (20) provided on one surface of the electrolyte membrane (18), and a second electrode (22) provided on the other surface of the electrolyte membrane (18), the frame member (24) including the resin sheet (24a) provided on the outer peripheral portion of the membrane electrode assembly over its entire periphery, wherein the outer peripheral portion of the electrolyte membrane is provided between the second electrode and the resin sheet, stacked on an outer peripheral portion of the second electrode, and joined to the inner peripheral portion of the resin sheet through the adhesive layer (24c), the elastic modulus of the resin sheet is larger than the elastic modulus of the electrolyte membrane, and the elastic modulus of the adhesive layer is smaller than the elastic modulus of the resin sheet and the elastic modulus of the electrolyte membrane.

What is claimed is:

1. A frame equipped membrane electrode assembly comprising:
    a membrane electrode assembly comprising an electrolyte membrane, a first electrode provided on one surface of the electrolyte membrane, and a second electrode provided on another surface of the electrolyte membrane; and
    a frame member including a first resin sheet provided on an outer peripheral portion of the membrane electrode assembly over its entire periphery, and a second resin sheet joined through an adhesive layer to a portion of the first resin sheet protruding outside of the second electrode,
    wherein an outer peripheral portion of the electrolyte membrane is provided between the second electrode and the first resin sheet, stacked on an outer peripheral portion of the second electrode, and joined to an inner peripheral portion of the first resin sheet through the adhesive layer, wherein the adhesive layer has a substantially constant thickness in areas between the first and second resin sheets and between the first resin sheet and the electrolyte membrane;
    an elastic modulus of the first resin sheet is larger than an elastic modulus of the electrolyte membrane; and
    an elastic modulus of the adhesive layer is smaller than the elastic modulus of the first resin sheet and is also smaller than the elastic modulus of the electrolyte membrane.

2. The frame equipped membrane electrode assembly according to claim 1, wherein a step is provided in the first electrode at a position corresponding to an inner peripheral end of the first resin sheet.

3. The frame equipped membrane electrode assembly according to claim 1, wherein an inner peripheral portion of the second resin sheet has an overlap part overlapped with an outer peripheral portion of the first electrode, as viewed in a thickness direction of the membrane electrode assembly.

4. The frame equipped membrane electrode assembly according to claim 1, wherein a thickness of the electrolyte membrane and a thickness of the adhesive layer are smaller than a thickness of the first resin sheet.

5. A fuel cell comprising a frame equipped membrane electrode assembly and separators provided on both sides of the frame equipped membrane electrode assembly, respectively,
    the frame equipped membrane electrode assembly comprising:
    a membrane electrode assembly comprising an electrolyte membrane, a first electrode provided on one surface of the electrolyte membrane, and a second electrode provided on another surface of the electrolyte membrane; and
    a frame member including a first resin sheet provided on an outer peripheral portion of the membrane electrode assembly over its entire periphery, and a second resin sheet joined through an adhesive layer to a portion of the first resin sheet protruding outside of the second electrode,
    wherein an outer peripheral portion of the electrolyte membrane is provided between the second electrode and the first resin sheet, stacked on an outer peripheral portion of the second electrode, and joined to an inner peripheral portion of the first resin sheet through the adhesive layer, wherein the adhesive layer has a substantially constant thickness in areas between the first and second resin sheets and between the first resin sheet and the electrolyte membrane;
    an elastic modulus of the first resin sheet is larger than an elastic modulus of the electrolyte membrane; and
    an elastic modulus of the adhesive layer is smaller than the elastic modulus of the first resin sheet and is also smaller than the elastic modulus of the electrolyte membrane.

* * * * *